United States Patent [19]

Norman et al.

[11] Patent Number: 5,799,734
[45] Date of Patent: Sep. 1, 1998

[54] METHOD OF FORMING AND USING PARTICULATE SLURRIES FOR WELL COMPLETION

[75] Inventors: Lewis R. Norman, Duncan; Billy F. Slabaugh, Marlow; Michael A. McCabe, Duncan; Ronnie G. Morgan, Waurika, all of Okla.

[73] Assignee: Halliburton Energy Services, Inc., Duncan, Okla.

[21] Appl. No.: 683,481

[22] Filed: Jul. 18, 1996

[51] Int. Cl.$^6$ .................. E21B 43/04; E21B 43/267
[52] U.S. Cl. .................. 166/278; 166/75.15; 166/177.5; 166/280; 507/904; 507/924
[58] Field of Search .................. 166/75.15, 90.1, 166/177.5, 276, 278, 280, 281, 292, 295, 300; 507/904, 922, 924

[56] References Cited

U.S. PATENT DOCUMENTS

| | | | |
|---|---|---|---|
| 3,256,181 | 6/1966 | Zingg et al. | 507/904 X |
| 3,417,819 | 12/1968 | Wyllie | 166/280 |
| 4,453,596 | 6/1984 | Conway et al. | 166/278 |
| 4,569,394 | 2/1986 | Sweatman et al. | 166/308 X |
| 4,780,243 | 10/1988 | Edgley et al. | 166/280 X |
| 4,829,100 | 5/1989 | Murphey et al. | 166/295 X |
| 5,095,987 | 3/1992 | Weaver et al. | 166/276 |
| 5,501,274 | 3/1996 | Nguyen et al. | 166/276 |
| 5,501,275 | 3/1996 | Card et al. | 166/280 |
| 5,515,920 | 5/1996 | Luk et al. | 166/177.5 X |

OTHER PUBLICATIONS

"Effects Of Shear Thinning Behavior As Mixer Viscometry Techniques" in Michigan Agricultural Experimental Station Journal, Article No. 12280, Apr. 1, 1987.

*Primary Examiner*—George A. Suchfield
*Attorney, Agent, or Firm*—Robert A. Kent

[57] ABSTRACT

A method of treating a subterranean formation penetrated by a wellbore utilizing a preformed high solids content slurry is prepared and transported to the wellsite. A portion of the slurry is admixed with a treatment fluid whereby the resultant solids content of the fluid is reduced and the fluid is introduced into a wellbore penetrating the subterranean formation. The high solids content slurry is substantially stable and the particulate does not substantially settle within the fluid prior to admixing with the treatment fluid thereby permitting large quantities of particulate to be rapidly admixed with a treatment fluid.

11 Claims, 1 Drawing Sheet

METHOD OF FORMING AND USING PARTICULATE SLURRIES FOR WELL COMPLETION

BACKGROUND OF THE INVENTION

1. Field of the Invention

The invention generally relates to a method of preparing a particulate slurry capable of subsequently being pumped into a subterranean formation. The particulate slurry can be utilized in stimulation treatments, to perform gravel packs or in the consolidation of at least partially unconsolidated formations.

2. Description of the Prior Art

The treatment of subterranean formations penetrated by a wellbore to increase the productivity of the well is known in the art. Various methods are known to achieve increased productivity from a subterranean formation. Such methods include well stimulation, both to initially stimulate a well and to improve production from producing wells, formation stabilization, wellbore cleanouts of producing wells and the like. With regard to well stimulation, emphasis has been placed on hydraulically fracturing formations with various liquids, which may contain propping agents suspended therein. When hydraulic pressure is applied to a subterranean formation by injection of a fluid into a wellbore penetrating the formation, the pressure of the fluid creates tensile stresses in the rock of the formation. The stresses ultimately cause splitting, parting or fracturing of the rock. The initially formed fracture or fractures can be extended in the formation by continued injection of fluid under sufficient pressure into the formation. The fractures can be maintained in a partially open position by the placement of propping agents into the fractures or by acid etching techniques. When a propping agent is employed, it is introduced into the fracture in admixture with the treating fluid. When the pressure is released, the fractures in the formation close upon the etched faces of the fracture or the propping agent to create productive channels in the subterranean formation. The quantity of propping agent in the fluid is of significance because it effects the open width and height of the propped fracture.

A variety of techniques have been developed in the art to address sand control problems in partially consolidated or unconsolidated formations. Contemporary completion techniques describe the introduction of a resin particulate slurry into the wellbore in such a fashion as to cause the slurry to flow into and pack in the annulus between the wellbore and production casing.

The particulate slurries utilized in the various completion techniques described above preferably contain a high particulate content to maximize the conductivity of the particulate packed channels and minimize fluid introduced into the subterranean formation as a result of the treatment. To achieve the high particulate concentration in the fluid, highly specialized and expensive mixing and pumping systems have been developed that must be moved or transported from one well location to another location as each treatment is performed. While the movement and use of heavy specialized equipment may not present significant problems for well locations near major roadways, remote locations and offshore wells present other problems. Offshore wells generally are treated from equipment located on barges or work boats which may be 200 to 300 feet long. The particulate feeding and mixing equipment as well as bulk particulate storage generally is located at the top or upper deck of the boat or barge because of its size. The heavy mixing equipment and bulk particulate storage can both limit the quantity of particulate that can be carried on the vessel as well as effecting the stability of the vessel through effect upon the center of buoyancy.

It would be desirable to provide a method by which proppant can be readily premixed or admixed with certain treatment fluids at a site remote from the wellsite, thus reducing or eliminating the need for complex mixing apparatus at the wellsite.

SUMMARY OF THE INVENTION

The present invention provides a method for treating a subterranean formation whereby significant quantities of a particulate may be readily admixed with a treatment fluid. The injection fluid may be prepared at a wellsite without the use of specialized equipment for handling dry proppant and/or without need for highly specialized mechanical mixing apparatus. The particulate is introduced into and admixed with the treatment fluid as a high solids content slurry for introduction into the subterranean formation.

The present invention is accomplished by first producing a high solids content particulate slurry which is transported to a wellsite, without settling of the particulate therein, and admixed with a treatment fluid for use in consolidation treatments or the like. The particulate slurry is formed by viscosifying a fluid to a visco-elastic state sufficient to support a particulate solids content of at least about 23 pounds per gallon. This "visco-elastic" state is further defined by three primary physical parameters: (1) the "apparent viscosity," defined as the ratio of viscometric shear stress to viscometric shear rate; (2) the "Maxwellian Stress Relaxation Decay Constant," defined as the time required for the Viscoelastic stress force to decay 64 percent of their initial value under constant strain; and (3) the "Maxwellian Equilibrium Elastic Limit," defined as the residual apparent Hookean elasticity after 10 minutes of stress relaxation decay. These "Visco-elastic Parameters" are based on a "Modified Maxwell" model consisting of a simple "Maxwell" model in parallel with a Hookean component, as described by J. F. Steffe in "Rheological Methods In Food Process Engineering," Freeman Press, East Lansing, Mich. These "Visco-elastic Parameters" were measured in a rotational geometry, by adapting the "Mixer Viscometry Technique" which is described in an article by K. L. Mackey, R. G. Morgan and J. F. Steffer entitled "Effects Of Shear Thinning Behavior As Mixer Viscometry Techniques" in the Michigan Agricultural Experimental Station Journal, Article No. 12280, Apr. 1, 1987, the entire disclosures of which are incorporated herein by reference. The said "Mixer Viscometry Technique" was modified to measure visco-elastic rotational stress decay under constant strain. The typical ranges of the Visco-elastic Properties which define fluids of the present invention are: (1) Apparent Viscosity ($V_1$), at shear rate equal to 1, in the range of from about 40,000 to 200,000 cp; (2) Maxwellian Stress Relaxation Constant ($E_1/V_1$) of from about 1 to about 3 minutes; and (3) Maxwellian Equilibrium Limit ($E_e$) in the range of from about 0.035 to about 0.1. The gelled fluid then is admixed with the particulate solids and the suspension is transported to a wellsite. The gelled fluid slurry is admixed with a treatment fluid at a wellsite whereby the solids content of the slurry is diluted by the treatment fluid and the resulting mixture is introduced into a subterranean formation.

DESCRIPTION OF THE PREFERRED EMBODIMENTS

Figure 1:
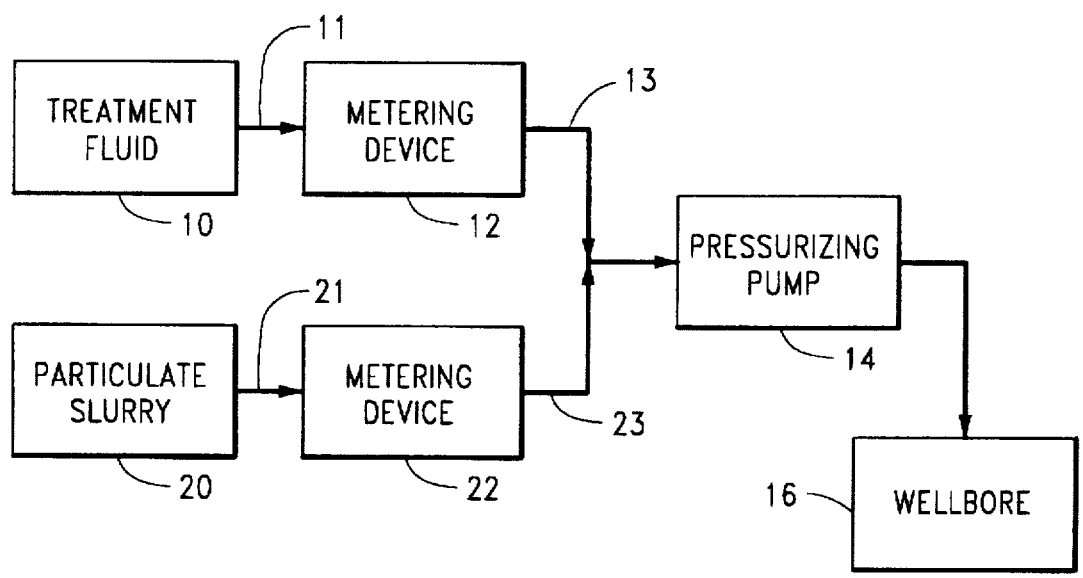
FIG. 1 is a diagrammatic schematic illustration of one embodiment of the present invention.

Turning now to the drawings, in accordance with the method of the present invention, a gelled treatment fluid is withdrawn from a vessel 10 through conduit 11 by a metering device 12 and introduced into a pressurizing pump 14 through a conduit 13 for introduction into a wellbore 16.

The fluid of the gel can comprise any water-containing fluid that does not adversely react with the subterranean formation or the other fluid constituents. For example, the fluid can comprise an aqueous mineral or organic acid, an aqueous salt solution such as potassium chloride solution, ammonium chloride solution, an aqueous organic quaternary ammonium chloride solution or the like.

The gelling agent employed to gel the fluid to form the treatment fluid can comprise substantially any of the viscosifying compounds known to function in the desired manner. The gelling agent can comprise, for example, substantially any polysaccharide polymer viscosifying agent such as guar gum, derivatized guars such as hydroxypropylguar, derivatized cellulosics such as hydroxyethylcellulose, derivatives of starch, polyvinyl alcohols, acrylamides, xanthan gums and the like. A specific example of a suitable gelling agent is guar, hydroxypropylguar, or carboxymethyl hydroxypropylguar present in an amount of from about 0.2 to about 0.75 weight percent in the fluid.

The gelled treatment fluid also can include conventional buffers, gel breakers gel stabilizers fluid loss additives, clay control agents, surfactants, crosslinking agents and the like.

Referring once again to the drawing, a particulate slurry is withdrawn from a vessel 20 through a conduit 21 by a metering device 22 and introduced into pressurizing pump 14 through a conduit 23. The particulate slurry intimately admixes with the aqueous gelled fluid within pump 14 prior to introduction into wellbore 16. The particulate slurry is prepared and placed in vessel 20 prior to initiation of the treatment upon wellbore 16. Preferably the slurry is prepared at least about four to six hours prior to the treatment. The particulate slurry may be prepared at the wellsite or preferably is prepared offsite prior to performance of the treatment and is transported to the wellsite. The slurry may be prepared utilizing conventional particulate feeding and mixing equipment as previously described herein. The aqueous fluid utilized to form the particulate slurry may comprise any of the aqueous fluids previously described for the gelled treatment fluid. The aqueous fluid is viscosified by the addition of a selected gelling agent. The gelling agent can comprise substantially any of the polysaccharide polymer viscosifying agents previously described, however, the gelling agent preferably comprises xanthan succinoglycan, or carbopol acrylic polymer. The gelling agent is admixed with the aqueous fluid in an amount of from about 0.2 to about 1.0 weight percent of the aqueous.

A particulate is admixed with the gelled aqueous in an amount of at least about 23 pounds per gallon of fluid. Preferably, the particulate is admixed with the fluid in an amount of from about 25 to about 26 pounds per gallon of fluid. The particulate can comprise any of the conventional gravel packing or fracturing propping agents. The particulate can comprise, for example, sized sand, resin coated sand, sintered bauxite beads, metal beads or balls, ceramic particles, glass beads, polymer resin beads, ground nut shells and the like. The particulate size generally may range from about 12 to about 100 on the U.S. Sieve Series, however, it is to be understood that in certain circumstances other sizes may be desired and will be entirely suitable for practice of the present invention. The gelled particulate slurry also may include any of the conventional additives identified previously for the treatment fluid. In one embodiment the particulate slurry also may include a temporary particulate flowback control agent such as that described in U.S. Pat. No. 5,501,275 or 5,501,274 the entire disclosures of which are incorporated herein by reference. The solid, semisolid or liquid flowback control material is admixed with the particulate slurry to form a suspension, which upon being deposited in the subterranean formation or within wellbore 16 forms a matrix of flowback control material and particulate which reduces migration of the particulate from the matrix that was created.

The particulate slurry is formulated such that the high solids content of particulate is retained in a fluidized state without significant setting during the period or interval during which the slurry is transported to the wellsite for performance of the treatment. The viscoelastic properties of the desired fluids of the present invention as determined by the methods previously identified herein are: (1) apparent viscosity, at shear rate of 1, in the range of from about 40,000 to about 200,000 cp; (2) Maxwellian Stress Relaxation of from about 1 to about 3 minutes; and (3) Maxwellian Equilibrium Limit in the range of from about 0.035 to about 0.1. The particulate slurry and gelled treatment fluid are admixed in varying amounts to permit graduated introduction of particulate into the treatment fluid. The particulate slurry may comprise from about zero to about 100 percent of the treatment fluid such that a particulate content of from about zero to about 26 pounds per gallon of treatment fluid can be introduced into the wellbore 16 for subsequent deposition within the subterranean formation.

Figure 2:
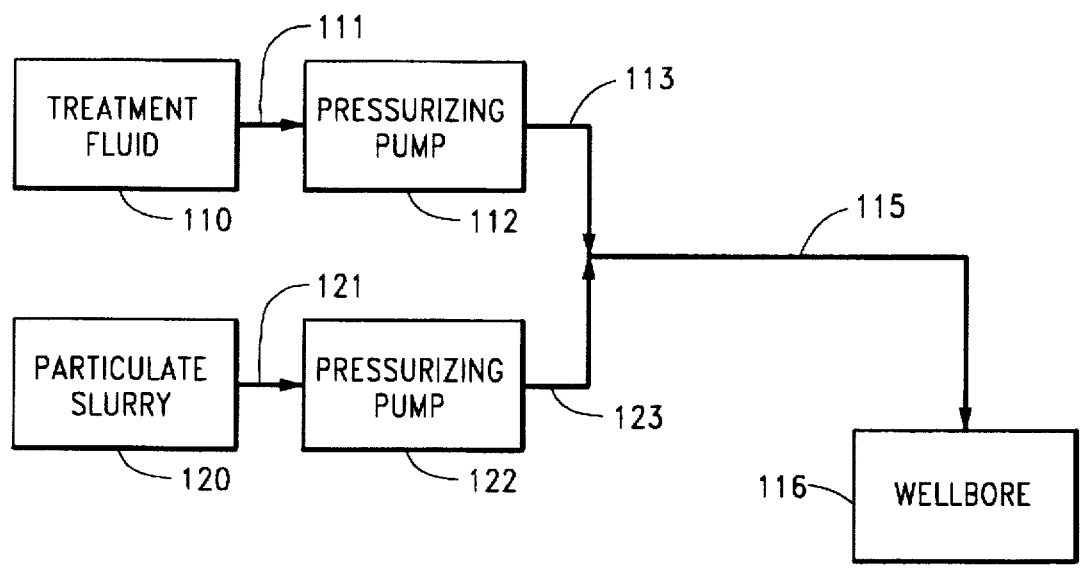
FIG. 2 is a diagrammatic schematic illustration of an alternative embodiment of the present invention.

Turning again to the drawings and with specific reference to FIG. 2, another embodiment of the present invention is illustrated. In this embodiment, a gelled treatment fluid is withdrawn from a vessel 110 through a conduit 111 by a pressurizing pump 112 and introduced at an elevated pressure into a line 113 where it is mixed with particulate slurry from a line at a tee or other union or mixing device and introduced into a wellbore 116 through a high pressure line 115. The treatment fluid may be prepared as previously described. The particulate slurry in a vessel 120 is withdrawn through a line 121 by a pressurizing pump 122 and passed at an elevated pressure through line 123 to meet the treatment fluid. The particulate slurry also may be prepared as previously described. The pressurizing pumps may comprise substantially any type of pump capable of raising the pressure of the fluid to a level for introduction into the subterranean formation. The pumps could comprise an "HT-400" Pump such as those manufactured by Halliburton Energy Services of Duncan, Okla. or any other suitable pump such as manufactured by Wheatley of Tulsa, Okla. or SPM of Ft. Worth, Tex.

To further illustrate the present invention, and not by way of limitation, the following examples are provided.

EXAMPLE I

A particulate slurry is formed by adding approximately 26.3 pounds of 20/40 mesh sand/gal with a gelled fluid. The gelled fluid is prepared by mixing 1000 gallons of water, adjusted to a pH of 4 with 60 pounds of "XANVIS" gelling agent and after hydration the pH is adjust to 11.5 by the addition of caustic. The particulate then is admixed with the gelled fluid in a mixer and stored in vessel. The slurry did not settle. The slurry is readily withdrawn from the vessel with a metering pump and admixed with an hydroxypropylguar viscosified treatment fluid in a yard test in a ratio to provide a sand concentration of from 0 to 16 pounds by stages as would be necessary for injection into a wellbore.

EXAMPLE II

The test described in Example I is repeated using a gelled fluid with the particulate prepared by admixing 0.225 percent by weight "CARBOPOL EZ" gelling agent, with 1000 gallons of water. The pH then is adjusted to 7 by addition of triethanolamine and approximately 26.3 pounds of sand is added in a mixer per gallon of fluid and the slurry stored. The slurry does settle within the vessel and is readily mixed with the viscosified treatment fluid.

While that which is considered to be the preferred embodiments of the invention has been described herein, it is to be understood that modifications and changes can be made in the methods and compositions utilized by one skilled in the art without departing from the spirit or scope of the invention as hereinafter set forth in the claims.

What is claimed is:

1. A Method for forming a particulate containing treatment fluid for introduction into a subterranean formation comprising:

preparing a treatment fluid containing a gelling agent;

preparing a particulate slurry by admixing a particulate with a gelled aqueous fluid of certain visco-elastic properties such that said particulate is present in an amount of at least about 23 pounds per gallon of fluid;

intermixing streams of said treatment fluid with said particulate slurry to form a particulate containing treatment fluid; and introducing the particulate containing treatment fluid stream into a wellbore penetrating a subterranean formation.

2. The method of claim 1 wherein said particulate slurry contains from about 23 to about 26 pounds particulate per gallon of fluid.

3. The method of claim 1 wherein said treatment fluid contains at least one member selected from the group of buffers, gel stabilizers, surfactants, fluid loss additives and crosslinking agents.

4. The method of claim 1 wherein said particulate slurry is prepared at least four hours prior to intermixing said particulate slurry with said treatment fluid and said particulate slurry remains a pumpable fluid during the time period from preparation to intermixing with said treatment fluid.

5. The method of claim 1 wherein said treatment fluid and particulate slurry are metered through a metering device to provide a particulate concentration in the intermixed stream in the range of from more than 0 to about 26 pound per gallon of mixture.

6. A method for treating a subterranean formation penetrated by a wellbore comprising:

preparing a treatment fluid containing a gelling agent to viscosity the fluid;

preparing a particulate slurry by admixing a particulate with a gelled aqueous fluid wherein said particulate is substantially non-settling in said gelled aqueous fluid and said particulate is present in an amount of at least about 23 pounds per gallon of fluid;

pumping a stream of said treatment fluid at an elevated pressure and pumping a stream of said particulate slurry at an elevated pressure and admixing said streams whereby a particulate containing treatment fluid is formed; and introducing the particulate containing treatment fluid into a wellbore penetrating a subterranean formation.

7. The method of claim 6 wherein said particulate comprises at least one member selected from the group of sand, ceramic particles, metal particles, sintered bauxite, resin coated sand, glass beads and polymer resin beads.

8. The method of claim 6 wherein said particulate slurry contains from about 23 to about 26 pounds particulate per gallon of fluid.

9. The method of claim 6 wherein said treatment fluid contains at least one member selected from the group of buffers, gel stabilizers, surfactants, fluid loss additives and crosslinking agents.

10. The method of claim 6 wherein said particulate slurry is prepared at least about four hours prior to intermixing said particulate slurry with said treatment fluid.

11. The method of claim 6 wherein the particulate containing treatment fluid contains particulate present in an amount of from more than 0 to about 26 pounds per gallon of fluid.

* * * * *